United States Patent [19]
Akimoto

[11] Patent Number: 6,060,088
[45] Date of Patent: May 9, 2000

[54] PREPARING A PACKAGED EDIBLE BAKED PRODUCT

[76] Inventor: Yoshihiko Akimoto, 2-3 Takasago-Cho, Kuroiso City, Tochigi, Japan, 325

[21] Appl. No.: 09/390,196

[22] Filed: Sep. 7, 1999

Related U.S. Application Data

[63] Continuation-in-part of application No. 08/807,723, Feb. 28, 1997, abandoned.

[51] Int. Cl.[7] .............................. A21D 2/08; A21D 8/06; A21D 8/08; B65B 29/08
[52] U.S. Cl. ............................. 426/8; 426/394; 426/398; 426/407; 426/411; 426/325; 426/326; 426/62; 426/128; 426/115; 426/120; 426/124; 426/113
[58] Field of Search ................................... 426/128, 113, 426/115, 411, 124, 407, 408, 403, 401, 404, 8, 412, 505, 394, 398, 325, 326, 62, 120

[56] References Cited

U.S. PATENT DOCUMENTS

| | | | |
|---|---|---|---|
| 1,146,709 | 7/1915 | Hugh | 426/124 |
| 1,411,223 | 3/1922 | Retzback . | |
| 1,437,512 | 12/1922 | Gereke | 426/113 |
| 1,505,999 | 8/1924 | Gereke | 426/113 |
| 1,942,212 | 1/1934 | Heseltine . | |
| 2,110,615 | 3/1938 | Wilcox | 426/115 |
| 2,664,358 | 12/1953 | Eichler | 426/124 |
| 2,858,220 | 10/1958 | Battiste . | |
| 2,911,307 | 11/1959 | Handler | 426/411 |
| 3,015,568 | 1/1962 | McLain . | |
| 3,443,971 | 5/1969 | Wood | 426/124 |
| 3,506,459 | 4/1970 | Parlour | 426/128 |
| 3,645,758 | 2/1972 | Macmanus | 426/124 |
| 4,120,984 | 10/1978 | Richardson et al. | 426/128 |
| 4,357,356 | 11/1982 | Joulin . | |
| 4,415,598 | 11/1983 | Chen et al. | 426/115 |
| 4,426,401 | 1/1984 | Ottow et al. | 426/128 |
| 4,525,367 | 6/1985 | Allison | 426/124 |
| 4,590,078 | 5/1986 | Umina . | |
| 4,610,885 | 9/1986 | Tait | 426/411 |
| 4,777,057 | 10/1988 | Sugisawa et al. . | |
| 4,813,791 | 3/1989 | Cullin | 426/124 |
| 4,856,650 | 8/1989 | Inoue | 426/124 |

FOREIGN PATENT DOCUMENTS

| | | | |
|---|---|---|---|
| 199583 | 9/1958 | Austria . | |
| 368601 | 5/1990 | European Pat. Off. | 426/124 |
| 3323147 | 6/1983 | Germany . | |
| 55-135542 | 10/1980 | Japan | 426/124 |
| 58-212779 | 12/1983 | Japan . | |
| 8105828 | 7/1983 | Netherlands | 426/128 |
| 423445 | 12/1974 | U.S.S.R. . | |
| 543376 | 3/1977 | U.S.S.R. . | |
| 1271892 | 4/1972 | United Kingdom . | |
| WO87/00506 | 1/1987 | WIPO | 426/128 |
| WO94/06301 | 3/1994 | WIPO | 426/128 |

OTHER PUBLICATIONS

McWilliams, "Canned white Bread for the Armed Forces," Bakers Weekly, (Oct. 11, 1954).
Food Engineering Jul. 1954 p. 123, 125.

*Primary Examiner*—Steven Weinstein
*Attorney, Agent, or Firm*—Gene Scott-Patent Law & Venture Group

[57] ABSTRACT

A canning method for bread, includes a stepwise procedure for producing a dough and baking a finished bread within a standard food can while enabling the bread to be stored for very long periods without spoiling or becoming inedible. The method includes sterilizing steps and means for easy removal of the bread from the can. A paper wrapper enables the bread to be maintained uniformly moist.

10 Claims, 4 Drawing Sheets

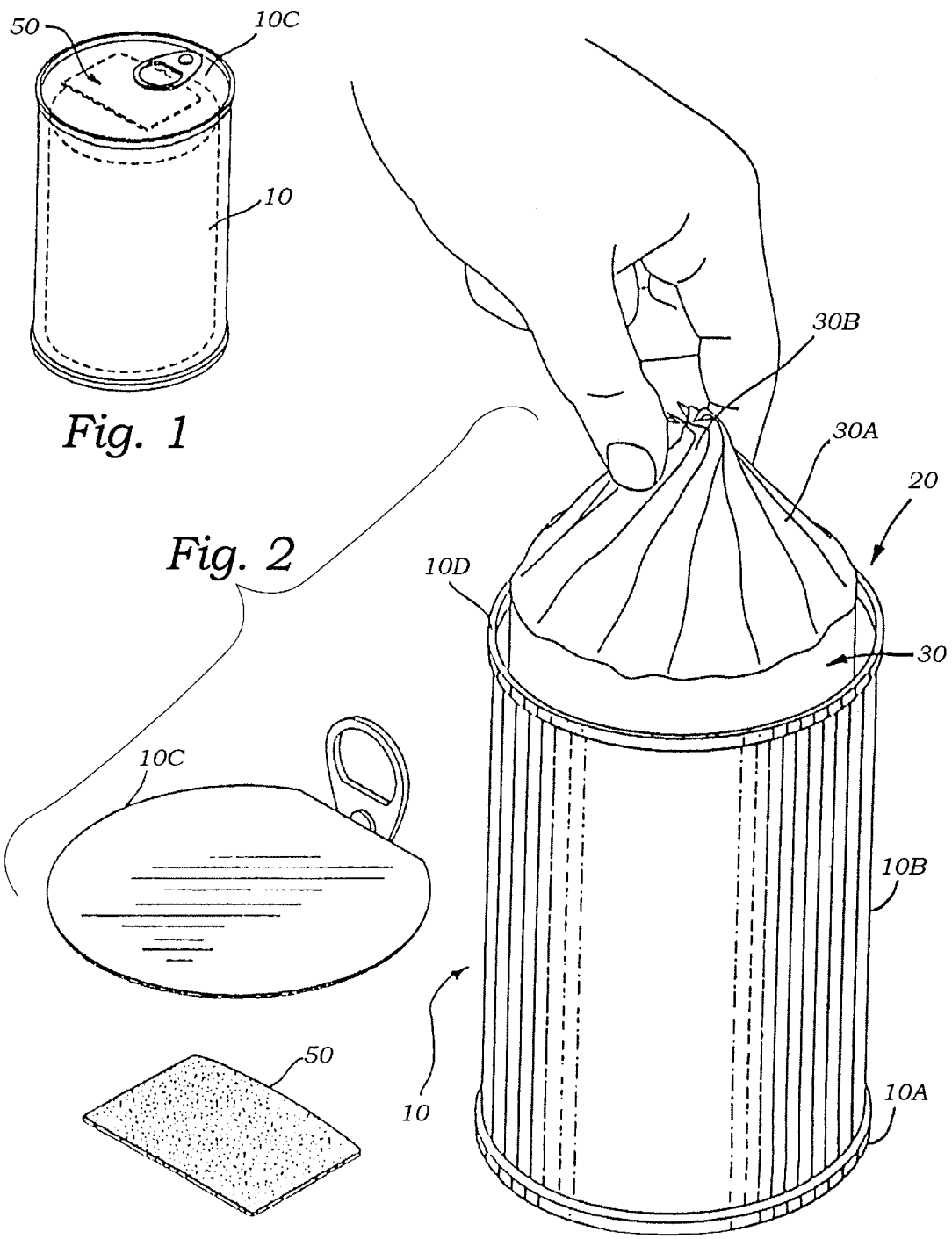

PREPARING A PACKAGED EDIBLE BAKED PRODUCT

This application is a continuation-in-part of a prior filed utility application having Ser. No. 08/807,723 and an assigned filing date of Feb. 28, 1997, now abandoned, and which contains subject matter identical to that described and claimed in the present application.

BACKGROUND OF THE INVENTION

1. Field of the Invention

The present invention relates generally to canned bakery products, and more particularly to a method for producing a baked-in-a-can bakery product capable of long storage and subsequent easy removal from the can.

2. Description of Related Art

The following art defines the present state of this field:

Battiste, U.S. Pat. No. 2,858,220 teaches a process for preparing an in-can baked canned rye seeded bread comprising a dough mix in a partially sealed container, whereupon the can is fully sealed after baking and then quickly cooled.

McLain, U.S. Pat. No. 3,015,568, teaches a package having a baked dough product thermeticaly sealed in a sheet metal can providing a double seam construction for protecting the dough product.

Joulin, U.S. Pat. No. 4,357,356 teaches a method of producing a bread product from dough which does not contain any artificial preservatives and includes partially baking the dough at the usual temperature, packing it in hermetic packages under partial vacuum, and sterilizing it while in the hermetic package. The product may be stored indefinitely at ambient temperatures in a condition that enables the user to provide a product having the characteristics of fresh bread by completing the baking step.

Umina, U.S. Pat. No. 4,590,078, teaches a process and apparatus for preparing baked products in tray-shaped cans, whereby venting means are provided as part of the baking apparatus for transfer of generated steam and gases from the inside of the can. Cover, are provided with channels for directing the outflow of steam and gases through a partially clinched lid of a tray-shaped baking can, while the baking is taking place. The baked product is permitted to rise uniformly, with no deformation that would normally occur when the steam and gases act to depress the baked product if they are confined to the baking can. Because a lighter, lower water-active batter is required for the process of the invention, the resulting baked product is light and evenly baked and has a substantially extended shelf-life.

Sugisawa et al., U.S. Pat. No. 4,777,057 teaches a packed semi-prepared dough for a baked confectionery having good taste and pleasing texture, which can be (easily prepared in households without special skill and can be stored over long periods. This semi-prepared dough is prepared by charging a dough having a dough hardness of 18 to 470 BU into a heat-resistant package container and then preliminary heat-treating it after the container is sealed.

British patent 1,271,892, teaches a method of making bread, sealing it in a container and further processed by heating for sterilization.

German patent DE 3323-147-A, teaches a packing method for fresh-baked confectionery, where the items are inserted in packages with an inert-gas atmosphere, preferably under slight pressure. While maintaining this atmosphere the packages are hot sealed. Nitrogen is used as the gas at a pressure of 0.1 bar. The method can be used to pack material such as noodles in order to avoid spoilage of items due to sticking to packing material as in a vacuum package.

McWilliams discloses in *Bakers Weekly*, Oct. 11, 1954 in an article entitled "Canned White Bread for the Armed Forces," a method for making canned bread.

The prior art teaches the canning of a bakery product. However, the prior art does not teach the inversion of a product baked in a container with an open top so as to expose the top surface of the product to a sterilizing temperature for fully sterilizing the product just prior to sealing it in the container in which it is baked in. The present invention teaches this technique and provides further related advantages as described in the following summary.

SUMMARY OF THE INVENTION

The present invention teaches certain benefits in construction and use which give rise to the objectives described below.

The present invention provides a method of baking a bread or other bakery product within a standard food can in order to produce a superior finished edible good that is ready for very long storage, easy removal from the container, and is delicious.

A primary objective of the present invention is to provide a method of preparing a bakery product baked in its storage container and having advantages in the completed product that are not taught in the prior art.

Another objective is to produce such a bakery product specifically as a bread capable of long storage.

A further objective is to enable long storage by the use of a simple container inversion step in the baking process which provides a simple and inexpensive way of sterilizing the top surface of the food product.

A still further objective is to enable such a bread to be removed from a standard food can with ease.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a perspective view of the preferred embodiment of the present method showing the finished product resulting therefrom;

FIG. 2 is a perspective view of the several components thereof including a container, flexible sheet paper liner enclosing a baked product, a lid and an oxygen scavenging packet;

DETAILED DESCRIPTION OF THE PREFERRED EMBODIMENT

Figure 3:
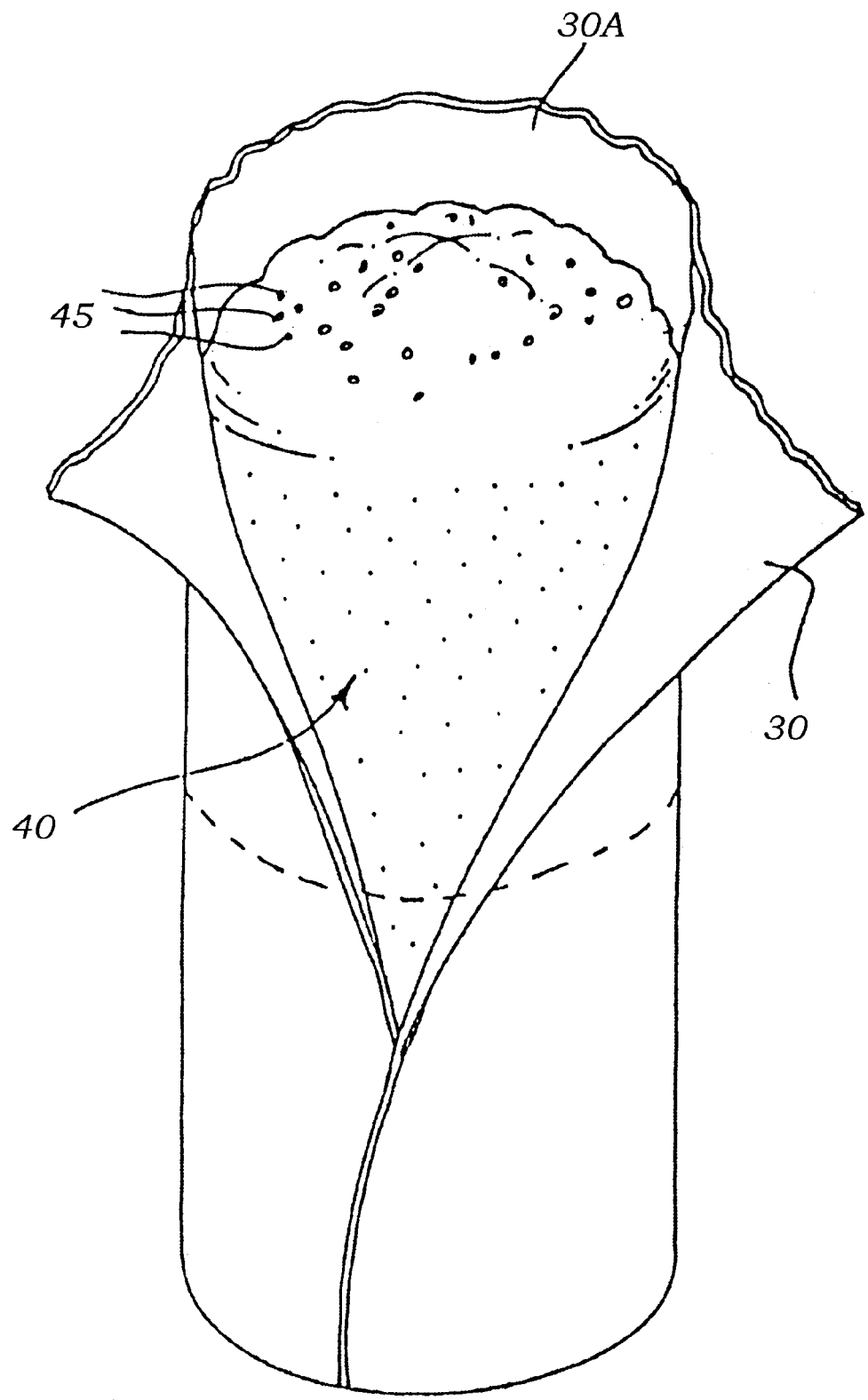
FIG. 3 is a perspective view of the baked product thereof shown wrapped in the paper liner thereof.

The present invention is a method for preparing and storing an edible bakery product, the method comprising the sequential steps of:

a) providing a container 10 having a bottom wall 10A integral with a side wall 10B terminating at an upper lip 10D, the upper lip 10D providing access lo an interior 20 of the container 10 as shown in FIGS. 1 and 2;

b) lining the container 10 with an absorbant flexible sheet material 30 so as to cover the bottom wall 10A and the side wall 10B at the interior 20;

c) preparing an edible bakery product dough 40 such as for bread, cakes, cookies and such;

d) placing the edible bakery product dough 40 into the sheet material 30 within the container 10 as shown in FIG. 3;

e) fermenting the edible bakery product dough 40 until the dough has risen to form a top surface 40A of the edible bakery product dough 40 adjacent the upper lip 10D of the container 10;

f) placing the container 10, sheet material 30 and edible bakery product dough 40 onto a heated surface within an oven (not shown);

g) baking the container 10, sheet material 30 and edible bakery product dough 40 at an appropriate temperature, such as approximately 170 degrees C for an appropriate time, such as between 25 and 40 minutes and preferably while driving steam over the container 10 so as to produce an edible bakery product, which is depicted also in FIG. 3;

h) inverting the container 10 so as to place the top surface 40A of the edible bakery product 40 into contact with the heated surface, preferably at a minimum temperature of approximately 200° C. for a duration of time sufficient for sterilization of the top surface 40A of the edible bakery product 40;

i) enclosing the top surface of the edible bakery product 40 with the sheet material 30 after inventively dusting the top surface 40A of the edible bakery product 40 with an antibacterial material 45 such as Panethone yeast;

j) cooling the container in a germ free environment; and k) sealing the container at the upper lip 10D with a cover lid 10C.

Figure 4:
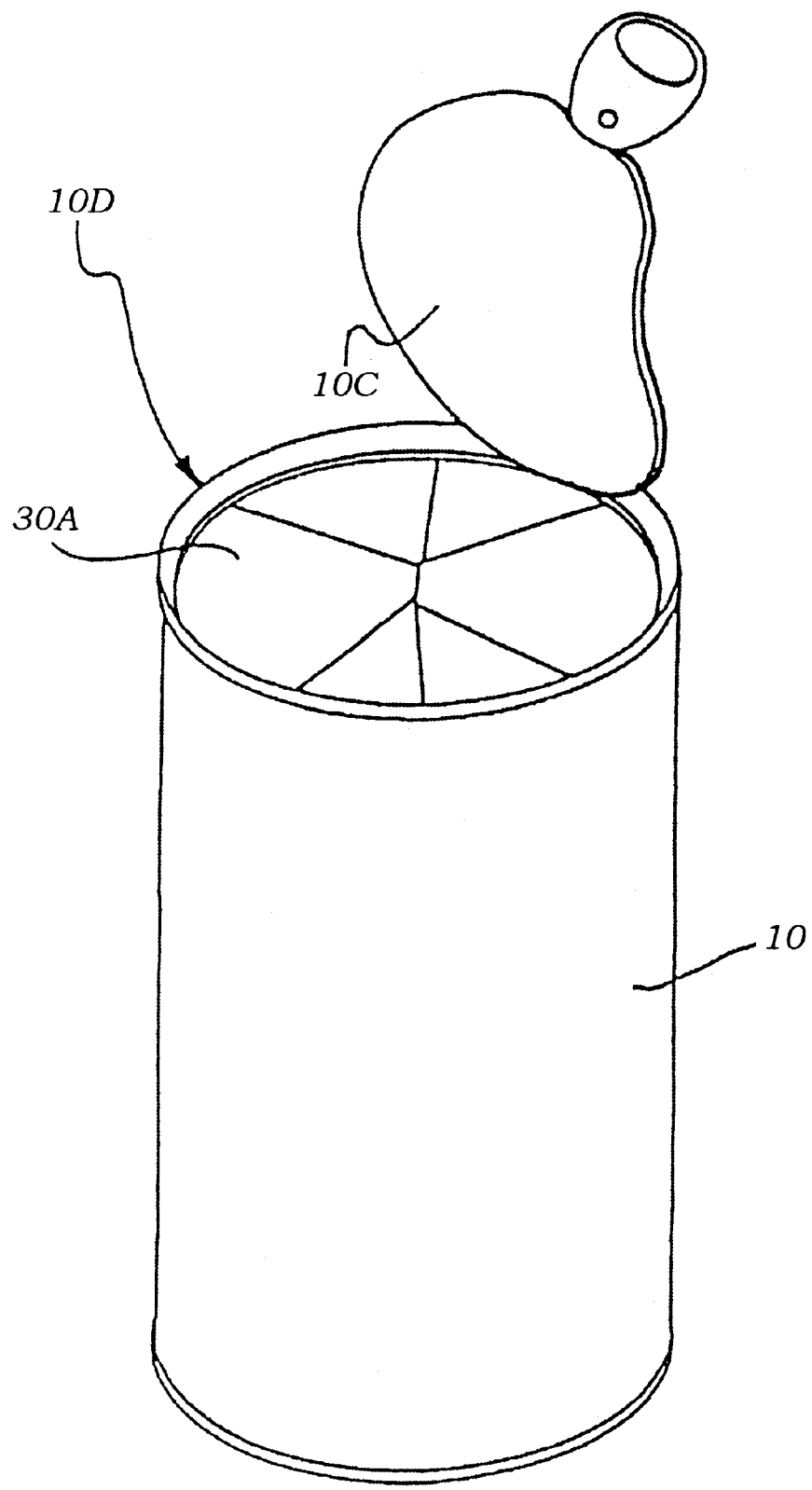
FIG. 4 is similar to FIG. 1 shown with the lid pulled-back for viewing the paper liner as fully enclosed in the container.

To accomplish the placement of the top surface 40A in direct contact with the heated surface, the sheet material 30 is folded over the outside of the container 10 as a packing margin 30A, prior to baking. After the antibacterial dusting, the sheet material packing margin 30A is then folded into the container 10 as shown in FIG. 4.

The method further comprises the step of removing oxygen from the container 10 prior to sealing and this may be completed in several ways such as by utilizing a vacuum method for removing air from the container, such method being well known in the art, inserting an oxygen scavenging material 50 into the container 10 prior to sealing the container, or replacing air in the container 10 with a gas not containing oxygen, such as nitrogen gas or any inert gas. Method steps for accomplishing these alternative elements of the present method are well known in the art and it is not the intension here to teach such elements, but only to teach that such steps are novel in the context of the present overall method.

The sheet material 30 is inventively selected for having sufficient tensilestrength for pulling the edible bakery product 40 from the container 10 by the packing margin 30A without tearing (see FIG. 2), and further for having a moisture absorption and wicking capacity for drawing moisture uniformly around the edible bakery product 40 while the edible bakery product is sealed within the container 10 so as to assure a uniformly moist edible bakery product 40. Preferably, the absorbant flexible sheet material 30 is made of a glassine paper which has been found to function well in the present application.

Figure 5:
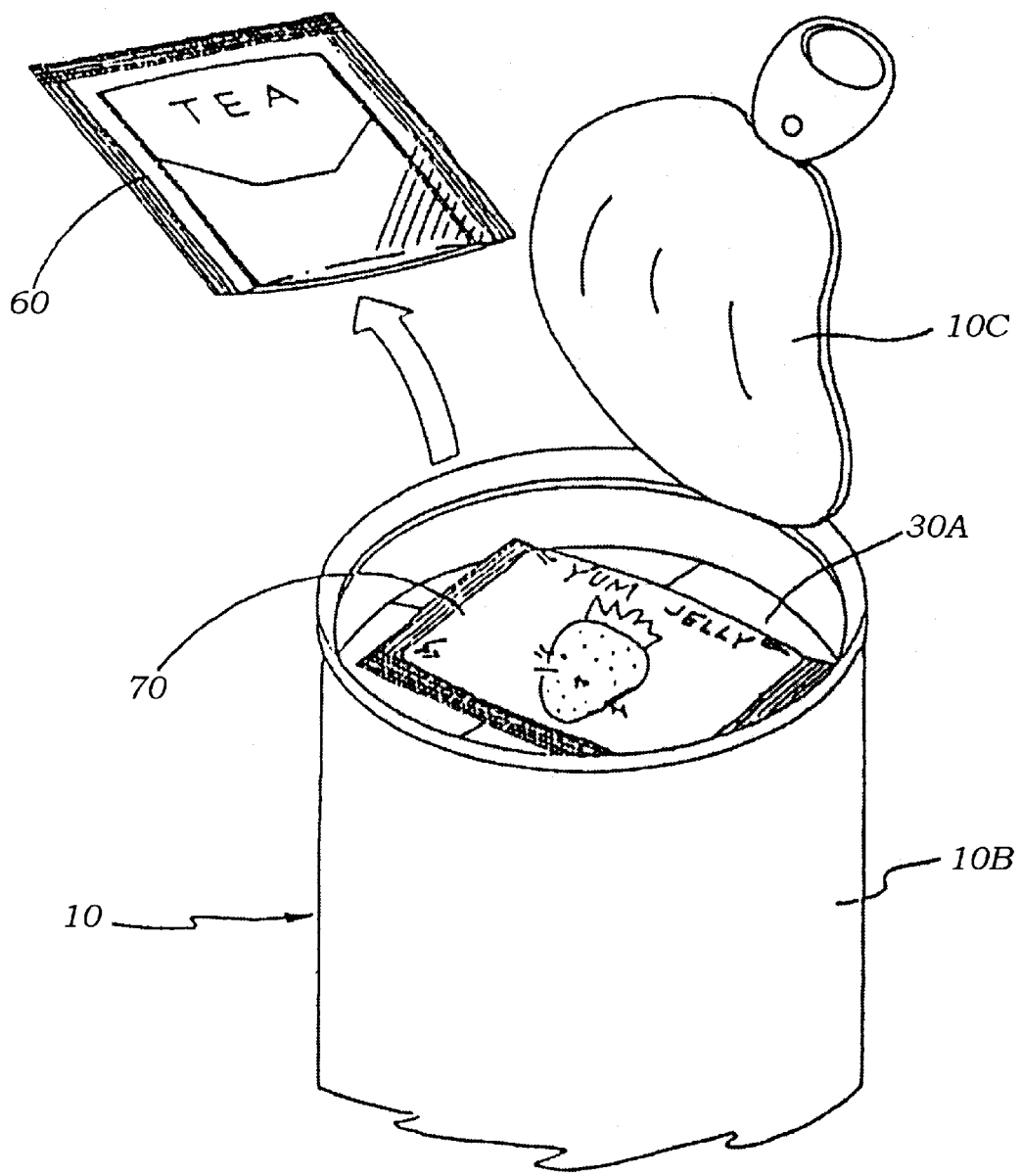
FIG. 5 is similar to FIG. 4; a partial view showing the upper portion of the container as a further embodiment with packed complementary food stuffs.

In a further embodiment of the invention, as shown in FIG. 5, the step of inserting certain companion food stuffs into the container 10 is included. As shown in the figure, packaged tea 60 and jelly 70 are only two of the many alternatives.

In studies conducted by this inventor it has been found that spoilage of canned bakery products is most frequently initiated at the top surface of the product, i.e., the last surface to be exposed to ambient air contamination prior to sealing of the container. It is difficult in a commercial bakery to control airborne germ vectors which way easily come into contact with the baked goods. Such vectors are well known for the utimate spoilage of such products. In the present method, the top surface of the baked product is superheated to sterilize this surface. Clearly, all germs within and on the bakery product 40 are killed during the baking process (step g of claim 1 below). However, during cooling down and preparation for sealing, the top surface of the bakery product 40 can, and usually does become contaminated with airborne germ vectors. However, all germs on the top surface are destroyed by the inversion step which is taken just after baking. Thereafter, the product 40 is transferred to a germ free environmental cooling station prior to sealing. These additional steps result in a very long self life for the product 40 due to the elimination of all vectors within the sealed package. It is noted that while the prior art teaches the movement of baked goods within an oven during baking this step is usually taken to assure an even baking of the product. The prior art does not teach the inversion of a container so as to set the baked goods into contact with a heated surface for sterilization purposes. Also of note, the prior art teaches the inclusion of a yeast into a baked goods, more or less homogeneously, so as to cause antibacterial action throughout. However, the prior art is silent concerning the step of dusting just the top of the baked product to prevent germs thereon from propagating. It is considered by this applicant to provide an important improvement in the baked goods business to be able to produce a long shelf-life product by the very simple and inexpensive expedients of inverting the container to bring the top (exposed) surface of the baked goods into contact with a sterilizing surface followed by cooling in a germ free environment. It is upon these novel steps in the instant method that novelty is claimed.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method of preparing a packaged edible baked product, the method comprising the steps of:

a) providing a storage container having a bottom wall, a side wall and an upper lip;

b) lining the container with a flexible sheet material so as to cover the bottom wall and the side wall of the container;

c) preparing a bakery product dough;

d) placing the dough into the sheet material within the container;

e) fermenting the dough until the dough has risen;

f) baking the dough contained in the lined container until the dough is made into an edible baked product, the edible baked product having an upper surface accessible to the upper lip of the container;

g) inverting the container prior to completion of the baking step, onto a surface at approximately 200° C. for sterilizing the upper surface of the baked product;

h) dusting the upper surface of the edible product with an antibacterial yeast;

i) enclosing the baked product with the sheet material by wrapping an upper portion of the sheet material over the upper surface;

j) inserting an oxygen scavenging material into the container; and k) sealing the container at the upper lip, said flexible sheet material having both a strength sufficient for pulling the baked product from the container and a moisture absorption and wicking capacity for distributing absorbed moisture uniformly around the baked product.

2. The method of claim 1 further comprising the step of removing oxygen from the container prior to sealing the container.

3. The method of claim 2 further comprising the removing of oxygen by utilizing a vacuum method for removing air from the container.

4. The method of claim 2 further comprising the step of replacing air in the container with a gas not containing oxygen.

5. The method of claim 4 wherein the gas not containing oxygen is nitrogen gas.

6. The method of claim 1 wherein baking is completed at a temperature of approximately 170 degrees C for between 25 and 40 minutes while driving steam over the container.

7. The method of claim 1 wherein the absorbant flexible sheet material is made of a glassine paper.

8. The method of claim 1 further comprising the step of inserting companion food stuffs into the container prior to sealing the container.

9. The method of claim 8 wherein the food stuffs include a tea.

10. The method of claim 8 wherein the food stuffs include a jelly.

* * * * *